US012026327B2

(12) United States Patent
Polygerinos et al.

(10) Patent No.: US 12,026,327 B2
(45) Date of Patent: Jul. 2, 2024

(54) WRITING INSTRUMENT

(71) Applicant: BIC Violex Single Member S.A., Anoixi (GR)

(72) Inventors: Panagiotis Polygerinos, Anoixi (GR); Nikolaos Chrysanthakopoulos, Anoixi (GR)

(73) Assignee: BIC Violex Single Member S.A., Anoixi (GR)

( * ) Notice: Subject to any disclaimer, the term of this patent is extended or adjusted under 35 U.S.C. 154(b) by 0 days.

(21) Appl. No.: 18/187,156

(22) Filed: Mar. 21, 2023

(65) Prior Publication Data

US 2023/0305647 A1    Sep. 28, 2023

(30) Foreign Application Priority Data

Mar. 25, 2022  (EP) ..................................... 22164386

(51) Int. Cl.
*G06F 3/0354* (2013.01)
*B25J 9/00* (2006.01)
(Continued)

(52) U.S. Cl.
CPC ........ *G06F 3/03546* (2013.01); *B25J 9/0084* (2013.01); *B25J 9/1679* (2013.01); *B43K 29/08* (2013.01); *G10L 15/22* (2013.01)

(58) Field of Classification Search
None
See application file for complete search history.

(56) References Cited

U.S. PATENT DOCUMENTS

| 4,211,012 A | 7/1980 | Alles et al. |
| 5,501,535 A | 3/1996 | Hastings et al. |
(Continued)

FOREIGN PATENT DOCUMENTS

| CN | 204172543 U | 2/2015 |
| CN | 104385808 A | 3/2015 |
(Continued)

OTHER PUBLICATIONS

European Search Report issued in EP 22164386.9 on Sep. 1, 2022 (8 pages).
(Continued)

*Primary Examiner* — Nicholas J Lee
(74) *Attorney, Agent, or Firm* — Bookoff McAndrews, PLLC

(57) ABSTRACT

A writing instrument comprising: an elongate body portion with distal and proximal ends defining a principal axis of the writing instrument; an electronically actuated nib manipulator with an end portion comprising a nib, attached to the proximal end to move the end portion within a spatial domain defined along first and second axes of a plane that is substantially orthogonal to the principal axis, and along a third axis that is an extension of the principal axis; an inertial measurement unit that measures the position of the principal axis relative to a writing surface; and an electronic control unit coupled to the inertial measurement unit and nib manipulator to obtain segment formation commands, and receive the position of the principal axis from the inertial measurement unit. The electronic control unit electronically actuates the nib manipulator so that the end portion moves within the spatial domain to scribe predefined characters.

20 Claims, 7 Drawing Sheets

(51) Int. Cl.
*B25J 9/16* (2006.01)
*B43K 29/08* (2006.01)
*G10L 15/22* (2006.01)

(56) References Cited

U.S. PATENT DOCUMENTS

| | | |
|---|---|---|
| 5,861,877 A | 1/1999 | Kagayama et al. |
| 7,627,703 B2 | 12/2009 | Oliver |
| 10,254,856 B2 | 4/2019 | Osterhout |
| 2015/0148948 A1 | 5/2015 | Singh et al. |
| 2020/0202741 A1 | 6/2020 | Zhong |

FOREIGN PATENT DOCUMENTS

| | | |
|---|---|---|
| CN | 107662431 A | 2/2018 |
| CN | 207052109 U | 2/2018 |
| CN | 107139606 B | 1/2019 |
| CN | 109263362 A | 1/2019 |
| CN | 109353141 A | 2/2019 |
| CN | 208530069 U | 2/2019 |
| CN | 209037248 U | 6/2019 |
| CN | 209224776 U | 8/2019 |
| CN | 110970033 A | 4/2020 |
| IN | 201711014117 A | 5/2017 |
| JP | 2005173807 A | 6/2005 |
| JP | 2006211497 A | 8/2006 |
| KR | 20090005210 A | 1/2009 |
| KR | 20090130478 A | 12/2009 |
| WO | 03001358 A1 | 1/2003 |

OTHER PUBLICATIONS

Kazutaka Kurihara, Masataka Goto, Jun Ogata, and Takeo Igarashi. 2006. Speech pen: predictive handwriting based on ambient multimodal recognition. In Proceedings of the SIGCHI Conference on Human Factors in Computing Systems (CHI '06). Association for Computing Machinery, New York, NY, USA, 851-860. https://doi.org/10.1145/1124772.1124897.

Mangesh et al., IEEE Maker Project, © Copyright 2023 IEEE, https://transmitter.ieee.org/makerproject/view/348dd (3 pages).

Schrapel, Maximilian & Stadler, Max-Ludwig & Rohs, Michael. (2018). Pentelligence: Combining Pen Tip Motion and Writing Sounds for Handwritten Digit Recognition. 1-11. 10.1145/3173574.3173705 (12 pages).

Scott B., Voice Command Self Writing Pen, © 2023 Prezi Inc., https://prezi.com/i7fpccypjphb/voice-command-self-writing-pen/?webgl=0 (3 pages).

Vidiyala Sri Sai Sudheer Kumar et al., Automatized Pen Writer by utilizing Voice Sensor Commands, International Journal of Research in Advent Technology, Special Issue NCKIETS'19 E-ISSN. 2321-9637 , http://www.ijrat.org/downloads/Conference_Proceedings/NCKIETS-19/NCKIETS-6.pdf (3 pages).

WRITING INSTRUMENT

This application claims priority from the European patent application EP22164386.9, filed on Mar. 25, 2022, the entire content of which being incorporated herein by reference.

TECHNICAL FIELD

The embodiments described herein relate to a writing instrument, an associated computer implemented method, system, computer program element, and computer readable medium.

BACKGROUND

The transcription of complicated symbols such as mathematical equations, or symbols from languages having a highly pictorial style, can be labour-intensive when using a manual writing instrument, and can be difficult for younger students, or for partially sighted people, or people with disabilities.

Printing out such equations or symbols using a computer printer might not be practical in all scenarios. Computer printers are bulky, have an initialization time, and require ink or toner refills, as well as the barrier of having to input equations into a computer manually through a graphical user interface such as an equation editor. Some, or all, of these factors are detrimental to collaborative communication, such as when spontaneously working on mathematical or scientific tasks. Furthermore, printing out such equations or symbols using a computer printer gives no insight into how the equations or symbols can be formed manually.

Accordingly, the transcription of symbols and equations can be further improved.

SUMMARY

According to a first aspect, there is provided a writing instrument comprising an elongate body portion enabling a user to grip the writing instrument. The elongate body portion comprises a distal end and a proximal end. The proximal end and the distal end define a principal axis of the writing instrument. The writing instrument comprises an electronically actuated nib manipulator attached to the proximal end of the elongate body portion. The nib manipulator further comprises an end portion comprising a nib. The nib manipulator is configured to move the end portion within a spatial domain defined (i) along first (XP) and second axes of a plane that is substantially orthogonal to the principal axis, and (ii) along a third axis that is an extension of the principal axis.

The writing instrument further comprises an inertial measurement unit configured to measure at least the position of the principal axis relative to a writing surface and an electronic control unit operatively coupled to at least the inertial measurement unit and the nib manipulator. The electronic control unit is configured to obtain one or more segment formation commands, and to receive the position of the principal axis from the inertial measurement unit The electronic control unit is configured to electronically actuate the nib manipulator so that the end portion moves within the spatial domain to scribe a predefined character defined by the one or more segment formation commands onto the writing surface.

According to a second aspect, there is provided a computer-implemented method for generating one or more segment formation commands for causing a writing instrument according to the first aspect or its embodiments, to scribe a predefined character onto the writing surface. The method comprises:

- obtaining an audio or graphical sample from a user;
- performing speech recognition on the audio sample, or image recognition on the graphical sample to convert the audio or graphical sample to one, or more, character identifiers;
- referencing one, or more, records of a predefined character store corresponding to the one, or more, character identifiers, wherein the predefined character store comprises a plurality of records indexed by one, or more, corresponding character identifiers, wherein each record comprises one or more segment formation commands configured to cause an electronically actuated nib manipulator of the writing instrument to form a predefined character; and
- providing the one or more segment formation commands to the writing instrument.

According to a third aspect, there is provided a system comprising a writing instrument according to the first aspect or its embodiments, an external processing apparatus, and a wireless communications network configured to communicably couple the writing instrument and the external processing apparatus.

The wireless modem of the writing instrument is configured to transmit an audio sample obtained by the microphone of the writing instrument to the external processing apparatus via the wireless communications network, and the external processing apparatus is configured to perform speech recognition on the audio sample, thus converting the audio sample to one, or more, character identifiers.

The external processing apparatus is configured to reference one, or more, records of a predefined character store corresponding to the one, or more, character identifiers, wherein the predefined character store comprises a plurality of records indexed by one, or more, corresponding character identifiers, wherein each record comprises one or more segment formation commands configured to cause an electronically actuated nib manipulator of the writing instrument to form a predefined character. The external processing apparatus is configured to transmit the one or more segment formation commands to the writing instrument.

According to a fourth aspect, there is provided a computer program element comprising machine readable instructions which, when executed by a processing apparatus, cause the processing apparatus to perform the computer implemented method of the second aspect, or its embodiments.

According to a fifth aspect, there is provided a computer readable medium comprising the computer program element according to the fourth aspect.

Effects of the above aspects include the following. The transcription of complex equations and pictorial symbols can be automatically performed by a writing instrument using an electronically actuated nib manipulator on an analogue writing surface (such as paper) using a regular ink pen, crayon, or pencil, in a legible way. Therefore, a student, disabled student, or partially sighted user using the writing instrument according to the aspects discussed herein can be included in scientific or artistic intellectual activities when it is not appropriate, or practical, to print out entire sheets of paper using a computer printer. This enables the transcription of notes quickly and legibly, without missing out on any information. In examples, the writing instrument can capture intended symbols using a speech conversion or graphical conversion approach, and print convex equations, pictorial symbols, or normal writing in any writing style and/or font.

BRIEF DESCRIPTION OF THE DRAWINGS

Other characteristics will be apparent from the accompanying drawings, which form a part of this disclosure. The drawings are intended to further explain the present disclosure and to enable a person skilled in the art to practice it. However, the drawings are intended as non-limiting examples. Common reference numerals on different figures indicate like or similar features.

DETAILED DESCRIPTION

Figure 1:
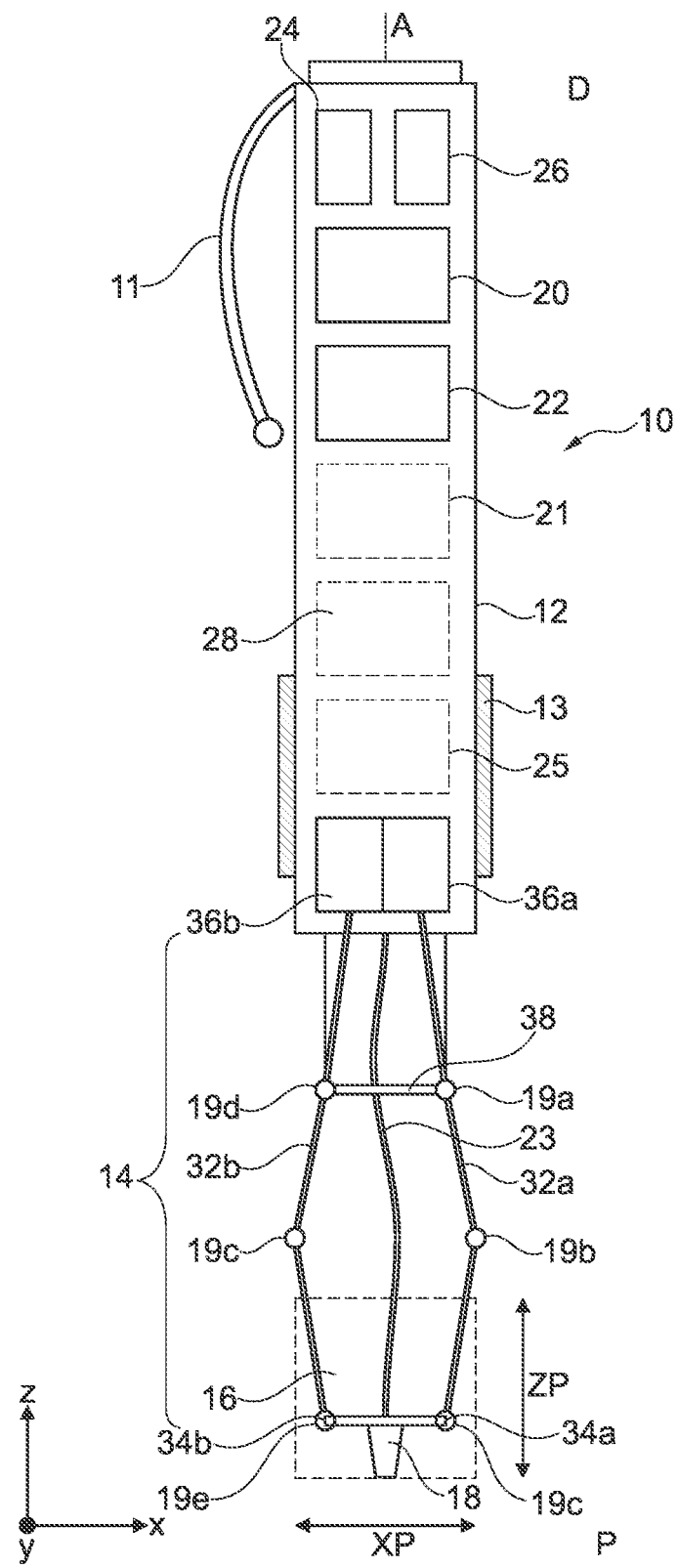
FIG. 1 schematically illustrates a longitudinal cross section of a writing instrument according to an example of the first aspect.

This specification concerns the transcription of notes, equations, pictorially based symbols as an alternative to a conventional computer printer. In the field of mechatronics, miniaturised mechanised structures are constantly being developed. The following specification concerns a miniature automatic mechanism in the form factor of a pen that could assist in improving handwriting when taking notes.

The present specification proposes to use a miniature high-resolution positioning system, such as a smart actuator, with an integrated drive means and controller. This can provide a powerful and compact motion system able to generate the high accuracy and force required for simulating writing using a hand-held writing instrument. Micro linear actuators, for example, enable such smart actuator is to be driven at a high-resolution. Micro linear actuators enable devices with a compact miniature size and precise position feedback. Micro linear actuators are used in fields of application such as consumer appliances, toys, remote control vehicles, and the like.

Speech recognition concerns obtaining an audio signal of human speech, and converting it to a machine readable representation, such as computer data in ASCII text format, or a format defining a methodical equations or pictorial symbols of a foreign language, as some examples. Once an audio signal has been converted into the machine readable representation, the machine readable representation can be converted to generate segment formation commands enabling a writing instrument comprising a smart actuator to form symbols on an analogue writing surface based on the human speech signal. In examples, a graphical representation of a symbol or line drawing can be obtained from a digital image, and converted into segment formation commands, enabling a writing instrument comprising a smart actuator to form symbols on an analogue writing surface based on the graphical representation.

In this specification, the term "proximal" refers to an end of a longitudinal element that is closest, (or relatively closer than a comparative element), to a writing surface, in use. The term "distal" refers to the end of a longitudinal element that is most distant, (or relatively more distant than a comparative element) from a writing surface, in use.

As will be discussed, the speed and clarity when transcribing notes using a regular writing implement can be improved by using a writing instrument (a pen-like device) comprising a mechanised actuator at the proximal end configured to contact a writing surface in use. The writing instrument can obtain segment formation commands containing instructions that define how the mechanised actuator should move in order to scribe a desired letter onto a writing surface. In particular, automatic character generation is performed using a miniaturised mechanism. An example of miniaturised mechanism is a delta robot having three degrees of freedom around the proximal end of the writing instrument although other mechanisms capable of performing character recognition can be applied. An inertial sensor of the writing instrument is configured to detect the orientation (position, or pose) of a principal axis of the writing instrument relative to a writing surface.

An algorithm can be used to generate the segment formation commands from speech captured by the writing instrument or an associated computing device. In examples, the segment formation commands are obtained from graphical input means such as a photograph or video capture of example text that should be formed by the writing instrument. In other examples, the segment formation commands are generated based on text input, or the input of a command language for defining mathematical equations, such as the "LaTeX" language.

Accordingly, one exemplary use case of the writing instrument is that a user of the writing instrument holds the writing instrument proximate to a writing surface, audibly enunciates a mathematical equation, and the miniaturised mechanism at the proximal end of writing instrument automatically scribes the equation onto the writing surface.

FIG. 1 schematically illustrates a longitudinal cross section of a writing instrument according to an example of the first aspect.

According to a first aspect, there is provided a writing instrument 10 comprising an elongate body portion 12 enabling a user to grip the writing instrument 10. The elongate body portion 12 comprises a distal end D and a proximal end P, and the proximal end P and the distal end D define a principal axis A of the writing instrument 10.

The writing instrument 10 comprises an electronically actuated nib manipulator 14 attached to the proximal end P of the elongate body portion 12. The nib manipulator 14 further comprises an end portion 16 comprising a nib 18. The nib manipulator 14 is configured to move the end portion 16 within a spatial domain defined (i) along first XP and second YP axes of a plane that is substantially orthogonal to the principal axis A and (ii) along a third ZP axis that is an extension of the principal axis A.

The writing instrument 10 comprises an inertial measurement unit 20 configured to measure at least the position of the principal axis A relative to a writing surface 62, and an electronic control unit 22 operatively coupled to at least the inertial measurement unit 20 and the nib manipulator 14. The electronic control unit 22 is configured to obtain one or more segment formation commands, and to receive the position of the principal axis from the inertial measurement unit 20. The electronic control unit 22 is configured to electronically actuate the nib manipulator 14 so that the end portion 16 moves within the spatial domain to scribe a predefined character defined by the segment formation command onto the writing surface 62.

Turning to FIG. 1, the elongate body portion 12 provides a support for other elements of the writing instrument 10, and is the element gripped by a user of the writing instrument 10, in use. A proximal and distal end of the elongate body portion 12 define points on a principal axis A of the writing instrument 10. The elongate body portion 12 has a distal end D which, in use, is further away from the writing surface 62 than the end of the elongate body portion 12 comprising a nib manipulator 14.

In examples, the writing implement 10 can have a circular, ovular, square, rectangular, pentagonal, hexagonal, or heptagonal cross-section along at least a portion.

The form-factor of the elongate body 12 can change along the principal axis A of the writing implement 10 to accommodate ergonomic variations or to enhance user comfort, for example (not illustrated).

In examples, the total length of the writing instrument 10 in the longitudinal direction L is between 50 mm and 200 mm, and specifically 140 mm. In an example, when the writing implement 10 has a circular cross-section, the maximum diameter of the writing implement is in the range of 6 mm to 25 mm, and specifically 15 mm. The elongate body of the writing implement 10 can, for example, be fabricated from polystyrene or polypropylene.

In examples, the elongate body portion 12 comprises a grip 13. The writing implement 10 can comprise, near to the proximal end P, a user grip 13 comprised of a resilient material such as rubber. The user grip 13 can be moulded to achieve an ergonomic match with a typical user profile, to enhance writing comfort. The grip 13 may be made from a polymeric, rubber, or foam material, for example. This enhances the stability of the elongate body portion 12 in the hand of a user while the nib manipulator mechanism 14 generates reaction forces whilst interacting with a writing surface 62. The elongate body 12 may be hollow, and functions as a mounting location for other elements of the writing instrument 10. In an example, electronic sub-assemblies and printed circuit boards are fixed to the elongate body 12 using a chassis.

The nib manipulator 14 is a mechanism comprising an end portion 16 at the proximal end P (which also forms the proximal end of the entire writing instrument 10). The end portion 16 comprises a nib 18. The nib 18 is, for example, a pen, pencil, felt-tip, crayon, or other member suitable for writing on a writing surface 62. When the nib 18 comprises a wet-ink-based nib, such as an ink-ball nib, a gel roller tip or a felt-tip, the nib 18 is connected to an ink storage member (not shown) inside the elongate body portion by a flexible tube 23 routed through the nib manipulator 14 mechanism.

The nib manipulator 14 can manipulate the nib 18 to a plurality of locations within a spatial domain defined by the particular characteristics of the nib manipulator 14 mechanism. In examples, the spatial domain is a cubic or cylindrical volume of free space relative to the coordinate directions XP, ZP, and YP (first, third, and second axes, respectively—owing to the projection of FIG. 1, YP is only illustrated in FIG. 4 subsequently). For example of automatically scribing a character, the nib manipulator 14 is manipulated by actuators 36*a*, 36*b*, 36*c* (36*c* is not shown in FIG. 1) to a position where the nib 18 contacts the writing surface 62. In examples, a contact detector, such as microswitch or electromagnetic monitoring of an actuator can be provided to detect when the nib 18 contacts the writing surface 62.

When scribing a symbol or character at a time when the elongate body portion 12 and its principal axis A is orthogonal to the writing surface 62, the nib 18 is moved by the nib manipulator 14 in a plane defined by the XP and XY planes, or a plane that is a parallel plane to the XP and XY planes in the ZP direction. The extent of the spatial domain illustrated in FIG. 1 by dotted lines is an example, and based on the exact type and dimensions of mechanism chosen for the nib manipulator 14, the extent of the spatial domain can be different, and the spatial domain may have a variety of shapes based on the design of the robotic mechanism of the nib manipulator, and its associated control laws.

In examples, when scribing a symbol or character at a time when the elongate body portion 12 and its principal axis A form a non-orthogonal angle with the writing surface 62 (for example, the principal axis A and the writing surface 62 can enclose an angle of 80 degrees, 70 degrees, 60 degrees, 50 degrees, or 45 degrees). In this case, the nib manipulator 14 transforms the position of the nib 18 in the ZP direction as well as the XP direction and the YP direction when scribing the character or symbol, to account for the non-orthogonal angle between the principal axis A and the writing surface 62.

Before describing examples of the mechanism of the nib manipulator 14 in more detail, further aspects of the writing instrument 10 will be discussed.

The writing instrument 10 comprises an inertial measurement unit 20, wherein the inertial measurement unit 20 is configured to measure a movement of the principal axis A of the writing instrument 10 between a first and a second position (or orientation, or pose). For example, the inertial measurement unit 20 is rigidly connected to the elongate body portion 12 and thus measures the movement of the principal axis A between a first and a second position (or orientation, or pose). The movement of the principal axis A through free space can be recorded by the inertial measurement unit 20 of the writing instrument 10, and communicated to the electronic control unit 22. In embodiments, the inertial measurement unit 20 is configured to measure one or more of the roll, pitch, yaw, x translation, y translation, and/or z translation of the principal axis A.

The inertial measurement unit 20 does not need to be aligned along the principal axis A in order to measure the movement of the principal axis A. For example, coordinate transformations can be applied to measurements of the inertial measurement unit 20 by the electronic control unit 22.

In examples, and with reference to the axes of FIG. 1, roll is a rotational force, or moment, of the principal axis A of the writing instrument 10 in the XY plane. Pitch is a rotational force, or moment, of the principal axis A of the writing instrument 10 in the YZ plane. Yaw is a rotational force, or moment, of the principal axis A of the support member 10 around the XZ plane, although other coordinate definitions can be used.

The inertial measurement unit 20 comprises one or more miniaturised sensors configured to sense the rotation and acceleration of the writing instrument 10. In examples, the inertial measurement unit 20 is comprised of a plurality of inertial measurement modules. In an example, the inertial measurement unit 20 comprises a plurality of integrated MEMS (micro-electromechanical system) accelerometers capable of measuring rotation and/or acceleration of a structure that the inertial measurement unit 20 is anchored to. Typically, the inertial measurement unit 20 would be soldered and/or glued to a printed circuit board rigidly attached to the elongate body portion 12, such that the inertial measurement unit 20 moves with the elongate body portion 12. In examples, the inertial measurement unit 20 measures rotation and/or acceleration in one, two, three, four, five, or six degrees of freedom. Measurement of an increased number of degrees of freedom can improve the accuracy of the position estimation of the writing instrument 10.

The inertial measurement unit 20 is communicably coupled to the electronic control unit 22 such that in use, rotation and/or acceleration feedback is provided to the electronic control unit 22 as an input to a control algorithm of the actuators of the arms 36a,b,c.

The writing instrument 10 comprises a power source 21 for providing electrical power to electronic circuitry of the writing instrument 10. In examples, the power source 21 is an alkaline battery (such as a AAA or an AA battery), a lithium battery, a Li-ion battery, and the like. The power source 21 can be embedded in the writing instrument. The power source 21 can either be disposable or rechargeable. In an example, the writing instrument 10 further comprises a charging port (not illustrated) such as a plug for receiving a charging cable. In examples, the power source 21 can be charged wirelessly using a wireless charging device (not illustrated).

The wireless modem 26 comprises a chipset capable of performing bidirectional wired data communication with the electronic control unit 22 comprised inside the writing instrument 10, and bidirectional or unidirectional wireless communication with another node in a wireless communication network 64. In particular, the wireless modem 26 is capable of communicating via Bluetooth™, Bluetooth Low Energy™, WiFi™ (802.11a, b, g, n, ac, ad), Wireless USB, UMTS, LTE, ZigBee™, and the like.

The writing instrument 10 further comprises an electronic control unit 22. In embodiment, the electronic control unit 22 is a microcontroller or microprocessor suitable for low energy, real-time processing such as an ARM™ Cortex A510, although a skilled person will be able to apply other microprocessors and circuitry.

The electronic control unit 22 is communicably coupled to at least the inertial measurement unit 20, and the actuators 36a,b,c. In embodiments, the electronic control unit 22 is communicably coupled to one or more of a microphone 24, a wireless modem 26, and/or a speech recognition unit 28 to be described subsequently.

The electronic control unit 22 is configured to execute the machine readable instructions that define a computer program for performing control laws and/or a control algorithm of the writing instrument 10.

In examples, the electronic control unit 22 is configured to receive segment formation commands 46. A segment may be a two-dimensional line, point, or arc automatically scribed on a writing surface 62 by the nib manipulator 14 of the writing instrument 10. A letter can be formed from a plurality of segments. For example, a symbol "O" is comprised of one segment that continuously to change in direction. A symbol "A" is comprised of two angled and opposed line segments, joined by a third horizontal line segment. In examples, a segment formation command comprises a 2D spatial definition of a segment in the plane of the writing surface 62 (such as by using 2D splines, a mathematical function, or a bitmap). In this case, the electronic control unit 22 is configured to generate actuation signals for the arm actuators 36a,b,c by applying the 2D spatial definition of a segment, with the position signals obtained by the inertial measurement unit 20, to the control laws appropriate to the robotic mechanism. In other words, a time-dependent geometric transformation between the 2D spatial definition of a segment and the position of the nib of the writing instrument is generated. In examples, segment formation command. In another example, a segment formation command 46 directly comprises the actuation signals for the arm actuators 36a,b,c required to form a given segment.

The electronic control unit 22 actuates the arm actuators 36a,b,c based on rotation and/or acceleration signals measured by the inertial measurement unit 20, and the one or more segment formation commands 46. The actuation of the arm actuators 36a,b,c based on the segment formation commands 46 and the rotation and/or acceleration signals is based on control laws of the particular nib manipulator 14 used in the writing instrument 10. In examples, the electronic control unit 22 is configured to apply delta robot control laws.

According to an embodiment, the computer program executed by the electronic control unit 22 is configured to obtain one or more segment formation commands 46. The segment formation commands 46 can be generated inside the writing instrument 10 using a microphone 24 in the writing instrument, and a speech recognition unit 28.

According to an embodiment, the electronic control unit 22 is configured to obtain segment formation commands 46 from an external processing apparatus 50 such as a smart phone, tablet, or personal computer, wirelessly transmitted to the writing instrument via the wireless modem 26.

According to another embodiment, the writing instrument 10 is configured to receive an audio instruction via the microphone 24, and to convert the audio instruction received via the microphone 24 into a character identifier 44 using the speech recognition unit 28 incorporated on the writing instrument 10. The character identifier 44 is transmitted, via the wireless modem 26, to an external computing apparatus 50. A predefined character store 29 hosted by the external processing apparatus 50 is interrogated to obtain one or more segment formation commands 46. The one or more segment formation commands 46 so obtained are transmitted back to the writing instrument 10.

In an embodiment, the electronic control unit 22 incorporates the speech recognition unit 28, and the speech recognition process is software defined. In an embodiment, the speech recognition unit 28 is provided as an independent FPGA or ASIC that is communicably coupled to the electronic control unit 22.

In use, a user holds the writing instrument 10 proximate to the writing surface 62. The writing instrument 10 is provisioned with at least one segment formation command capable of enabling the nib manipulator 14 of the writing instrument 10 to scribe a predefined character on the writing surface 62. The segment formation command 46 can be provided in a number of ways to be discussed subsequently. The inertial measurement unit 20 detects the position of the writing instrument 10, and signals the position to the electronic control unit 22. The electronic control unit 22 executes control laws or algorithms based on at least the signal from the inertial measurement unit 22 and the segment formation command 46. Actuators 36a-c of the nib manipulator 14 repositions the nib 18 within the spatial domain XP, YP, ZP as defined by the segment formation command 46, and this causes the nib 18 to form a letter on the writing surface 62. Although the writing instrument 10 can automatically scribe a single symbol, the inertial measurement unit 20 is configured to detect a continuous displacement of the position of the principal axis A of the writing instrument 10 as a user moves the writing instrument 10 in a line across a page of the writing surface 62.

In embodiments, the writing instrument 10 further comprises a microphone 24 coupled to an audio processing unit (not illustrated) and a wireless modem 26. The microphone 24 is configured to obtain an audio sample from a user proximate to the writing instrument, and the audio processing unit is configured to apply pre-processing to the audio sample.

For example, the microphone 24 is a capacitive microphone (of the "electret") type, or a MEMs microphone. These types of microphones provide good audio resolution whilst having a small form factor enabling easy mounting inside the writing instrument 10. In examples, the microphone 24 is located at the distal end of the writing instrument 10. The elongate body portion 12 is provided with a grille enabling sound waves from a user to pass through the elongate body portion to the microphone 24.

In embodiments, the elongate body portion 12 further comprises either (i) an ink supply (not illustrated), and a flexible supply tube 23 configured to supply ink to the nib 18, or (ii) a pencil or crayon attachment. The flexible supply tube 23 is sized to enable the nib manipulator 14 to move freely throughout the spatial domain XP, YP, ZP, while still enabling ink to be supplied to the nib 18 at the proximal end of the writing instrument 10.

In examples, the elongate body portion 12 comprises a clip 11 for securing the writing instrument 10 when not in use.

In embodiments, the nib manipulator 14 comprises a robotic mechanism 30 that is configured to move the end portion 16 of the nib manipulator 14 within the spatial domain. The robotic mechanism comprises a plurality of arms 32 a,b,c. Each arm of the plurality of arms comprises a proximal end 34 a,b,c coupled to the end portion 16, and the distal end of each arm is coupled to a corresponding actuator 36 a,b,c.

In the example illustrated in FIG. 1, the nib manipulator 14 is a robotic mechanism 30 having three degrees of freedom defining the spatial domain XP, YP, and ZP. The nib 18 is attached to the proximal end of the robotic mechanism 30 as the end-effector. In embodiments, the robotic mechanism 30 is a delta mechanism, or delta robot. In embodiments, the robotic mechanism 30 is a parallel robot. A delta robot is a member of the class of parallel robots. Parallel robots comprise a plurality of kinematic chains connecting the base of the robot (in this case, the base of the robot can be considered to be the proximal end of the elongate body portion 12 to which the nib manipulator 14 is mounted).

A parallel robot or delta robot is a generalisation of a four-bar linkage. The concept of the four bar linkage is to use parallelograms to restrict the movement of the end portion 16 of the mechanism to a pure translation in space. In other words, the robotic mechanism 30 forming the nib manipulator 14 restricts motion of the end portion 16 to translation in the spatial domain XP, YP, and ZP. In embodiments, the robotic mechanism prevents rotation of the end portion 16 around the principal axis A.

The specific example of the robot illustrated in FIG. 1-FIG. 3 will now be described. A skilled person will understand that variations of the robot, or the types of robotic mechanism, can be provided that also fulfil the functionality of a nib manipulator 14 capable of moving the nib 18 in the spatial domain XP, YP, and ZP, and that the subsequent explosion is exemplary.

Figure 3:
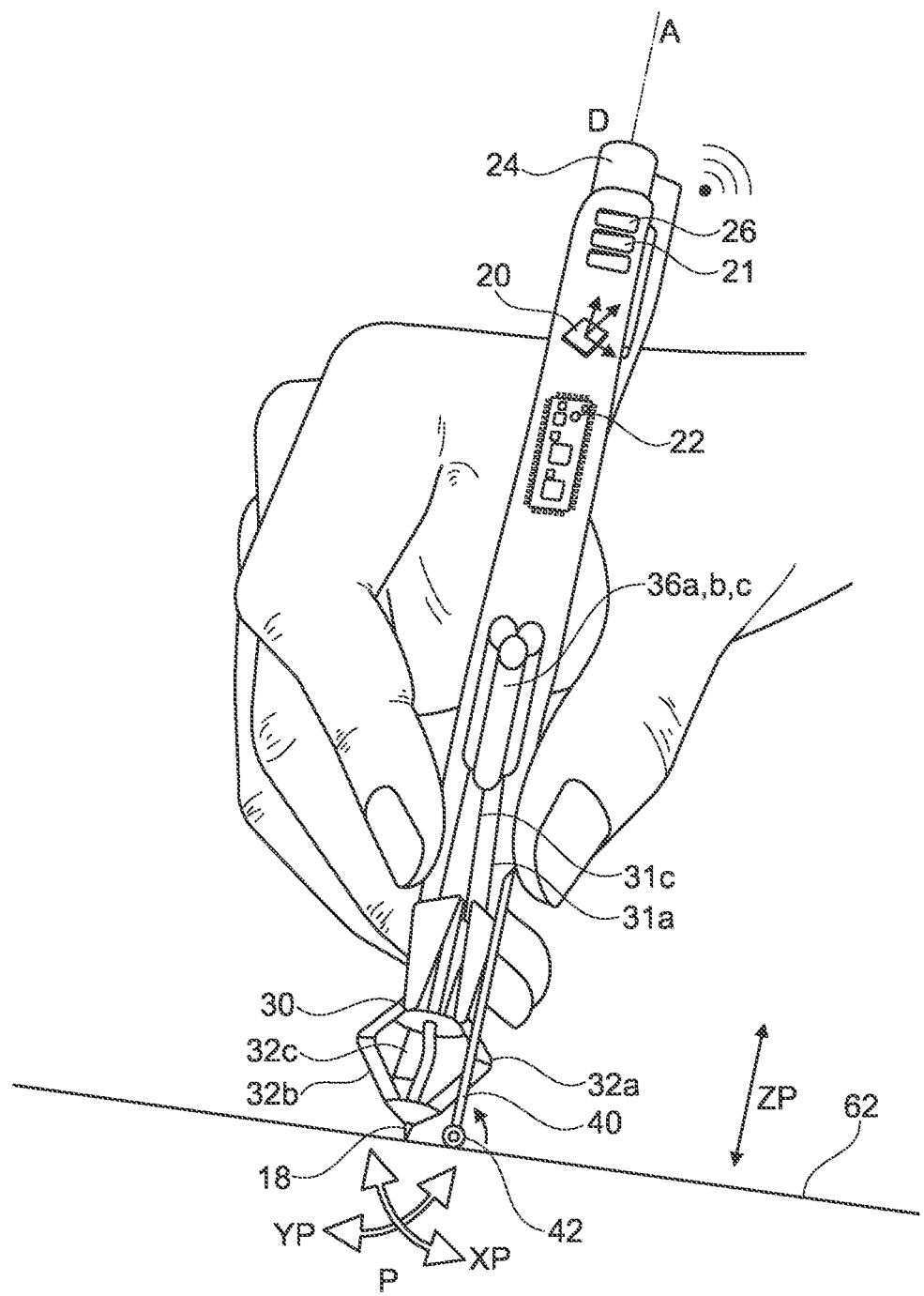
FIG. 3 schematically illustrates a writing instrument according to an example of the first aspect, in use.

The design of delta robot illustrated in FIG. 1 should be considered in conjunction with FIG. 3. For reasons of clarity, the side projection of FIG. 1 omits a third robotic arm 32c, which is however visible in the projection of FIG. 3. The nib manipulator 14 comprises a robotic mechanism 30 actuated by actuators 36a, b, c (36a is not shown in FIG. 1).

A first arm 32a of the delta robot illustrated in FIG. 1 extends from the proximal end of the elongate body portion 12. The first arm 32a comprises a first joint 19a. The first joint 19a flexibly couples the jointed arm 32a to a forming plate 38. The forming plate 38 couples all arms 32a,b,c together. The first arm 32a further comprises an intermediate joint 19b enabling the first arm 32a to extend or be retracted along the ZP dimension of the spatial domain. The first arm 32a further comprises a proximal joint 19c at the proximal end 34a of the first arm 32a. The proximal joint 19a couples the proximal end 34a of the first arm 32a to the end portion 16.

A second arm 32b of the delta robot illustrated in FIG. 1 extends from the proximal end of the elongate body portion 12. The second arm 32b comprises a fourth joint 19d. The fourth joint 19d flexibly couples the second arm 32b to the forming plate 38, such that a mechanical link exists between the first arm 32a and the second arm 32b. The second arm 32b further comprises an intermediate joint 19e enabling the second arm 32b to extend or be retracted along the ZP dimension of the spatial domain. The second arm 32b further comprises a proximal joint 19e at the proximal end 34b of the second arm 32b. The proximal joint 19e couples the proximal end 34b of the second arm 32b to the end portion 16.

The delta robot comprising the exemplary robotic mechanism 30 may further comprise a third arm 32c. The third arm 32c is not illustrated in FIG. 1, but is illustrated in FIG. 3. The third arm 32c is of substantially the same design as the first 32a and second arms 32b, and is also attached to the forming plate 38.

In an embodiment, the forming plate 38 and the end portion 16 are circular. In an embodiment, the forming plate 38 and the end portion 16 are triangular. When the forming plate 38 and the end portion 16 are triangular, each of the first 32a, second 32b, and third 32c arms are attached to respective corners of the triangular forming plate 38 and triangular end portion 16.

In embodiments, the first 32a, second 32b, and third 32c arms each comprise elongated trapezoidal shapes. In embodiments, first 32a, second 32b, and third 32c arms are made from a composite material. In embodiments, first 32a, second 32b, and third 32c arms are made from carbon fibre or Kevlar™. Therefore, the first 32a, second 32b, and third 32c arms are made from a thin flexible material that can bend while each arm holds the elongate body portion 12 and the end portion 16.

In embodiments, the joints 19a-e are made of a passive flexible material such as Kapton film. Therefore, the moving parts of the nib manipulator 14 have a small inertia, enabling the nib manipulator to achieve high speed and high acceleration, so that the nib manipulator 14 can move the nib 18 quickly when forming an equation or symbol on a writing surface 62 at speeds matching, or exceeding, a human writer.

The arm actuators 36a, 36b, 36c exert the necessary forces on the first 32a, second 32b, and third 32c arms for actuating the nib manipulator 14.

In an embodiment, the arm actuators 36a, 36b, 36c are linear actuators. The tension from the three linear arm actuators 36a, 36b, and 36c is transmitted to each of the arm actuators 36a, 36b, 36c to the first 32a, second 32b, and third 32c arms via an axial translation of three corresponding rigid links, such as rods, or push-pull cables, induced by the arm actuators 36a, 36b, 36c. In another example, the arm actuators 36a, 36b, 36c are three motors configured to wind and unwind three corresponding wire linkages.

In an embodiment, the arm actuators 36a, 36b, 36c comprise position feedback that is communicably transmitted to the electronic control unit 22. For example, the arm actuators 36a, 36b, 36c are complete, self-contained motion devices with position feedback for sophisticated position control capabilities. In another example, the arm actuators 36a, 36b, 36c comprise end of limit switches for simpler position automation and feedback. The arm actuators 36a, 36b, 36c can provide digital or analogue position feedback.

In an embodiment, the electronic control unit 22 is configured to receive position feedback from the arm actuators 36a, 36b, 36c for use with the control laws executed by the electronic control unit 22 to achieve delta robot operation. Therefore, combining the motion of the arm actuators 36a, 36b, 36c enables the end portion 16 to move with 3 degrees of freedom in the spatial domain XP, YP, and ZP.

Figures 2A, 2B:
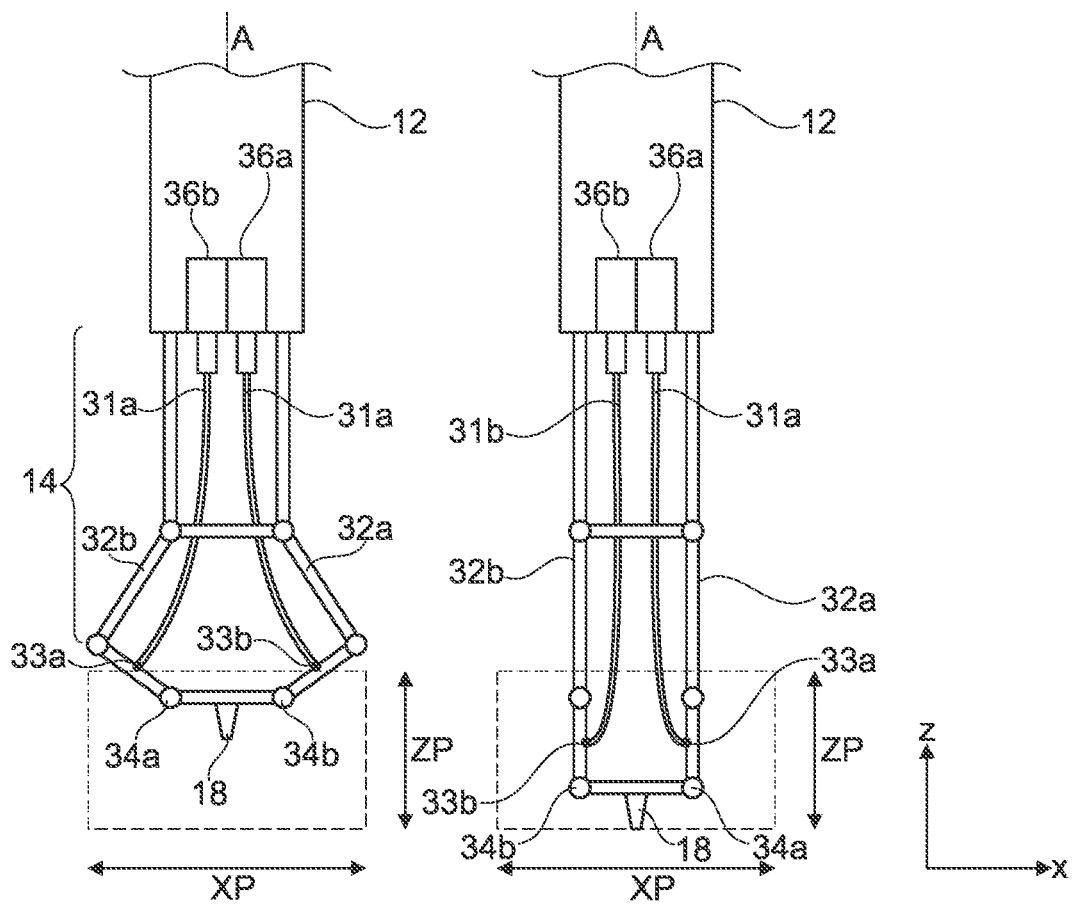
FIG. 2a schematically illustrates a longitudinal cross section of a proximal portion of the writing instrument according to an example of the first aspect when its nib manipulator is in a first position within a spatial domain.
FIG. 2b schematically illustrates a longitudinal cross section of a proximal portion of the writing instrument according to an example of the first aspect when its nib manipulator is in a second position within a spatial domain.

FIG. 2a schematically illustrates a longitudinal cross section of a proximal portion of the writing instrument according to an example of the first aspect when its nib manipulator is in a first position within a spatial domain.

In FIG. 2a, an example of actuation links 31a, 31b of respective first arm 32a and second arm 32b are illustrated anchored to corresponding first 36a and second 36b arm actuators using anchors 33a, 33b respectively. For example, the anchors 33a, 33b comprise an epoxy resin and/or an articulated socket capable of securing the actuation links 31a, 31b to the first 36a and second 36b arm actuators. According to examples, the actuation links 31a, 31b comprise a rigid polymeric, composite, or metal rod, a polymeric cord, or a tensionable metal wire.

FIG. 2b schematically illustrates a longitudinal cross section of a proximal portion of the writing instrument according to an example of the first aspect when its nib manipulator is in a second position within a spatial domain.

The projections of FIG. 2a and FIG. 2b do not illustrate actuator 36c for reasons of clarity, although actuator 36c should be assumed to be present and actuated by a third actuator 36c.

In FIG. 2a, the actuators 36a, 36b and 36c (not illustrated) have withdrawn corresponding actuation links to an equal degree, such that the end portion 16 of the nib manipulator 14 is parallel to the XP-YP plane of the spatial domain, and the nib 18 is substantially fully withdrawn in the ZP direction of spatial domain.

In FIG. 2b, the actuators 36a, 36b and 36c have advanced the corresponding actuation links to an equal degree, such that the end portion 16 of the nib manipulator 14 is still parallel to the XP-YP plane of the spatial domain, and the nib 18 is substantially fully extended in the ZP direction of spatial domain.

The motion illustrated in the transition between FIG. 2a and FIG. 2b could, therefore, be considered to be an example of placing a single dot on a writing surface 62 (not shown). Although not illustrated, a case where the principal axis A of the writing instrument 10 is not perpendicular to the writing surface 62 is possible. Uncorrected, this would cause the end portion 16 of the nib manipulator 14 to coincide, or meet, the writing surface 62 at a suboptimal angle.

In such case, the inertial measurement unit 20 of the writing instrument 10 is configured to detect the orientation of the principal axis A, and to communicate a corresponding measurement of the orientation of the principal axis A to the electronic control unit 22. A control law or algorithm in the electronic control unit 22, if receiving a segment formation command to form a single dot, detects that the angulation of the principal axis A implies a correction to the orientation of the end portion 16 of nib manipulator 14.

In this case, the electronic control unit 22 is configured to send a modified control signal to the first actuator 36a so that the first arm 32a extends further, or not as far, as the second arm 32b. The control law or algorithm is configured to calculate the disparity in actuation of the first actuator 36a relative to the second actuator 36b based on control laws of the robotic mechanism 30 comprised in the nib manipulator 14. In examples, the algorithm executed by the electronic control unit 22 partially references control laws of a Delta robot. The result is that the end portion 16 of the nib manipulator 18 is correctly oriented with respect to the writing surface 62, even in view of the displacement of the principal axis A of the writing instrument 10.

The definition of a correct orientation of the principal axis A with respect to the writing surface 62 is a function of at least the type of robot used to the nib manipulator, the type of nib 18 comprised on the end portion 16, the shape of the end portion 16, and potentially user-specific traits concerning posture when writing, for example.

Accordingly, the robotic mechanism of the nib manipulator enables a wide range of characters to be scribed rapidly on a writing surface based on a segment formation command 46 provided as an input to, or generated by, the electronic control unit 22.

FIG. 3 schematically illustrates a writing instrument 10 according to an example of the first aspect, in use.

In particular, FIG. 3 illustrates a nib manipulator 14 comprising three arms 32a-c attached to three corresponding actuators 36a-c. The illustrated nib manipulator 14 is a type of Delta mechanism or Delta robot.

According to an example, the actuators 36a-c comprise piezoelectric strips (not illustrated) that are mechanically connected to corresponding arms 32a-c. For example, the piezoelectric strips are laminated at flexible joints of the arms 32a-c and are configured to actuate the arms in the manner of a delta robot.

Figure 4:
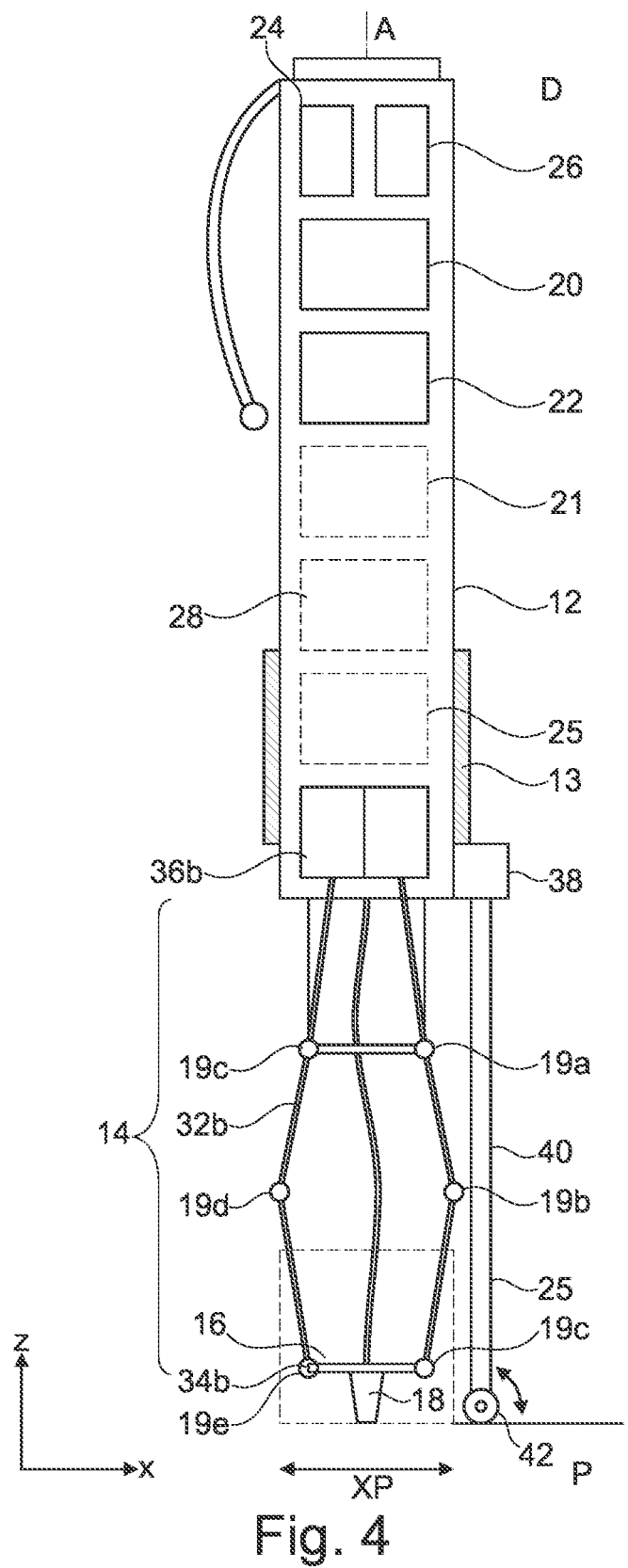
FIG. 4 schematically illustrates a longitudinal cross section of a writing instrument according to another example of the first aspect.

FIG. 4 schematically illustrates a longitudinal cross section of a writing instrument according to another example of the first aspect.

In embodiments, the writing instrument 10 further comprises a displacement detector 25 attached to the writing instrument 10. The displacement detector 25 is configured to detect, in use, a displacement velocity of the writing instrument across the writing surface 62. The electronic control unit 22 is configured to receive from the displacement detector 25, the displacement velocity of the writing instrument, and to electronically actuate the nib manipulator 14 based, additionally, on the displacement rate of the writing instrument.

In embodiments, the writing instrument 10 further comprises a protrusion 27 from the proximal end P of the elongate body portion 12, and a proximal end P of the protrusion 27 comprises a measuring element that is communicably coupled to the displacement detector 25. The measuring element is a trackball, or a tracking wheel 42 comprises a position encoder, or an optical sensor configured to contact the writing surface 62, in use.

The displacement detector 25 can also identify the displacement velocity of the writing instrument 10 using inertial means, optical means. In the example of FIG. 4, an example of a writing instrument 10 comprising a protrusion 27 is shown. The example of the writing instrument 10 in FIG. 4 further comprises a protrusion mount 38 rigidly attached to the elongate body portion 12 of the writing instrument 10. An elongate protrusion 40 extends from the protrusion mount 38 substantially along the direction of the principal axis A towards the proximal end of the nib manipulator 14, when the nib manipulator 14 is fully extended. The proximal end of the protrusion 40 comprises the displacement detector 25.

The protrusion aids a user of the writing instrument 10 when writing by enabling the user to hold the writing instrument 10 at a distance away from the writing surface 62 such that the spatial domain XP, YP, ZP defined by the nib mechanism 40 envelops (or is coincident with) the writing surface 62. In the example of FIG. 4, the measuring element communicably coupled to the displacement detector 25 is a tracking wheel 42. In examples, the tracking wheel 42 comprises an encoder to detect the speed and/or velocity of writing by user. The tracking wheel 42 is made of a rigid or resilient material, and is mounted with an axle at its centre. As an example, the tracking wheel 42 comprises an outer surface made with a rubber-like material, to enable an increase in friction when writing on the writing surface 62. The tracking wheel 42 enables the writing instrument to be supported whilst the nib manipulator 14 moves the nib 18 in different directions. In addition, a tracking signal obtained from the encoder comprised in the tracking wheel 42 enables synchronisation of the nib manipulator 14 when forming characters on the writing surface 62.

In an embodiment, the electronic control unit 22 is configured to receive a tracking signal from the encoder of tracking wheel 42 characterising the displacement of the proximal end of the writing instrument 10 relative to the writing surface 62. The control or algorithm executed by the electronic control unit 22 is, in examples, configured to combine the signal from the encoder of the tracking wheel 42 with one or more of the roll, pitch, yaw, X displacement, Y displacement, and/or Z displacement measured by the inertial measurement unit 20.

In (non-illustrated) examples, the displacement detector 25 may be an optical or acoustic displacement sensor configured to send a tracking single to the electronic control unit 22 characterising the motion of the proximal end of the writing instrument 10 relative to the writing surface 62.

In embodiments, the writing instrument 10 further comprises a contact detector capable of detecting that the nib 18 comprised on the end portion 16 is in contact with the writing surface 62. The electronic control unit 22 is configured to receive, from the contact detector, a contact signal indicating that the end portion 16 is in contact with the writing surface 62, and the electronic control unit 22 is configured to begin scribing the predetermined character upon reception of the contact signal.

In examples, one or more of the actuators 36a-c can function as the contact detector by sensing mechanical resistance to motion commands from the electronic control unit 22. In another example, the interface between the proximal end of the elongate body portion 12 and the nib manipulator 14 can comprise a compressible seat comprising a microswitch or a proximity detector performing the function of the contact detector.

In embodiments, the writing instrument 10 further comprises a speech recognition unit 28, and a predefined character store 29 comprising a plurality of records. Each record comprises (i) one or more segment formation commands configured to cause the electronically actuated nib manipulator 14 to form a predefined character, and (ii) one or more character identifiers corresponding to an audio sample (or a command or symbol name referenced by the audio sample) identifying the predefined character.

The microphone 24 is configured to obtain an audio sample comprising a writing instruction from a user, and the audio processing unit 47 is configured to pre-process the writing instruction. The speech recognition unit 28 is configured to obtain the audio sample from the audio processing unit and to convert the audio sample to a character identifier referencing a record of the predefined character store. The electronic control unit 22 is configured to obtain one or more segment formation commands from the predefined character store corresponding to the character identifier, and to scribe the predefined character on the writing surface 62 based on the received audio sample.

As stated above, the speech recognition unit 28 is, in an embodiment, provided by speech recognition software operated by the electronic control unit 22. In an embodiment, the speech recognition unit 28 is provided as an independent FPGA or ASIC that is communicably coupled to the electronic control unit 22.

Figure 5:
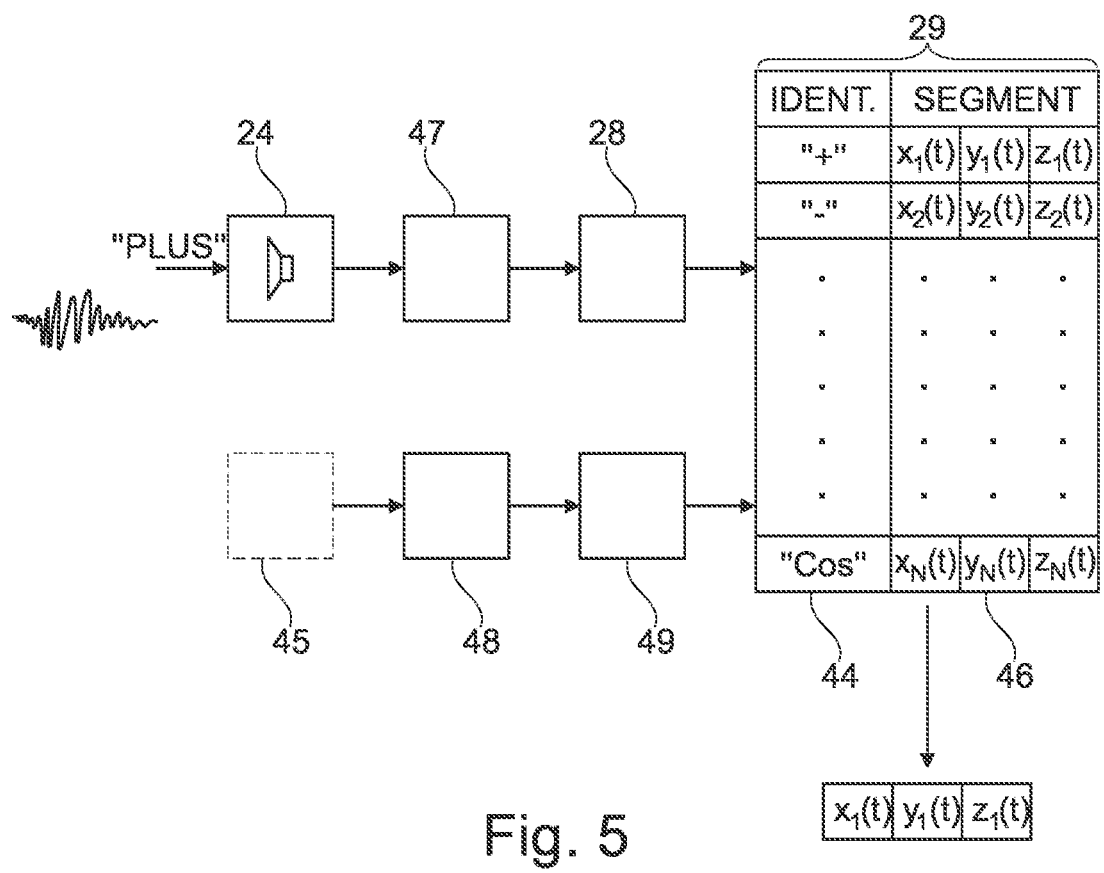
FIG. 5 schematically illustrates an example of obtaining a segment formation command.

FIG. 5 schematically illustrates an example of obtaining a segment formation command.

If obtained via speech recognition, a user audibly enunciates a word as an instruction that should be written by the writing instrument 10. In the illustrated case, the enunciated word is "Plus", although it could be the name of any mathematical symbol or letter in any language, for example.

A microphone 24 captures the enunciated word. Microphone 24 can be located in the writing instrument 10, or in an external processing apparatus 50 such as smart device, tablet, personal computer, or a smart phone. An audio processing unit 47 receives the enunciated word as an analogue or digital sample from the microphone 24. The audio processing unit 47 performs filtering, background noise reduction, and other functions to improve the likelihood that the analogue or digital sample is identified by the speech recognition unit 28 as the same word as the enunciated word. The audio processing unit 47 outputs the filtered signal to the speech recognition unit 28.

The speech recognition unit 28 obtains, using the signal output by the audio processing unit 47, one or more character identifiers defining a symbol to be described by the writing instrument 10. One character identifier can map to more than one enunciated symbol. For example, the same "+" character identifier can be returned by the speech recognition unit 28 if the enunciated word is "PLUS" or "ADD".

The predefined character store 29 is, in examples, a database. The database comprises a record for each character identifier. Each record comprises a character identifier 44 uniquely identifying a character that can be scribed by the writing instrument 10. Each record logically associates a character that can be scribed by the writing instrument 10 with a segment formation command comprised in a segment formation command field 46 of the record.

In FIG. 5, a segment formation command for the "+" character identifier comprises the time domain trajectories $[X_1(t), Y_1(t), Z_1(t)]$. The time domain trajectories define the spatial location of the nib 18 inside the spatial domain XP, YP, ZP with respect to a time index that subdivides a total time required to scribe a specific enunciated word on the writing surface 62. Accordingly, the segment formation command 46 referenced by the character identifier 44 is provided to the electronic control unit 22 of the writing instrument 10. The control laws and/or algorithms comprised in the electronic control unit 22 convert the segment formation command 46 to drive signals of the actuators 36a-c. In another example, the segment formation command comprises the actuator drive signals. In examples, the segment formation command 46 can be a continuous or discontinuous multidimensional function of other parameters such as, for example, the intended font, or font size, the line width of the writing instrument 10, the surface type of the writing surface 62, and the like. In examples, the segment formation command 46 is a function of the angulation of the principal axis A of the writing instrument 10 relative to the writing surface 62, as detected by the inertial measurement unit 22. In examples, the predefined character store can be personalised to a specific user of the writing instrument 10. Therefore, the writing instrument 10 can automatically scribe a given character in a wide range of styles or according to a wide range of use contexts of the combination of writing instrument 10 and writing surface 62.

According to an embodiment, the writing instrument 10 and/or an external processing apparatus 50 that is communicably coupled to the writing instrument 10 is configured to obtain one or more symbols to be scribed by the writing instrument 10 via a text editor or word processing program executed by the external processing apparatus 50. For example, a user inputs a mathematical equation into a user interface such as the equation editor in Microsoft Word™. The mathematical equation can be transmitted, using a Microsoft Word software plug-in, to the writing instrument 10, where the mathematical equation is used to interrogate the predetermined character store 29 to obtain at least one segment formation command 46.

According to an embodiment, the writing instrument 10 and/or an external processing apparatus 50 communicably coupled to the writing instrument 10 can perform the lookup of the segment formation command 46 based on a graphical input. For example, an external processing apparatus 50 is configured to obtain a graphical image of a symbol is intended to be automatically written by the writing instrument 10. For example, a user could take a picture of an intended symbol using a smart phone camera 45. An image preprocessing unit 48 obtains the basic image data from the smart phone camera 45, and performs functions such as noise reduction, and optical preprocessing to improve the chance of a correct symbol being identified by an image recognition unit 49. The image recognition unit 29 obtains the preprocessed image, and performs image recognition. Image recognition unit 29 outputs at least one character identifier 44 capable of being used to interrogate the predefined character store 29 and to obtain at least one segment formation command 46 using a graphical input.

In embodiments, the wireless modem 26 of writing instrument 10 is configured to transmit the audio sample to an external processing apparatus 50. The wireless modem 26 is configured to receive the one or more segment formation commands 46 from the external processing apparatus 50 in response to the external processing apparatus receiving the audio sample.

The electronic control unit 22 is configured to obtain the one or more segment formation commands 46 from the wireless modem 26, and to actuate the electronically actuated nib manipulator 14 to scribe the one or more predefined characters on the writing surface 62 as defined in the audio sample.

For example, a synchronous audio speech recognition program receives the audio sample from the writing instrument 10 via a speech-to-text application programming interface (API) hosted on an external processing apparatus 50. The speech-to-text API performs speech recognition on the data, and returns a machine readable representation of the converted speech when the audio sample from the writing instrument 10 has been processed. The machine readable representation of the converted speech can be used to generate segment formation commands for operating the electronically actuated nib manipulator 14 of the writing instrument 10 according to the first aspect. Synchronous recognition performs speech recognition on an audio data sample of up to one minute of duration, according to current technology, for example.

The speech recognition process can be performed by the writing instrument 10. In an embodiment, the writing instrument 10 comprises a microphone 24, and the electronic control unit 22 can comprise the predetermined character store 29 in an embedded memory comprised inside electronic control unit 22. In this case, the writing instrument 10 can convert speech to a written symbol without external intervention.

According to an embodiment, the speech recognition process is performed by the writing instrument 10. The writing instrument 10 communicates, via the wireless modem 26, a character identifier to a predetermined character store 29 hosted by an external processing apparatus 50. The external processing apparatus 50 looks up a segment formation command 46, and transmits the segment formation command 46 corresponding to the character identifier 44 back to the right instrument 10. In this case, the predetermined character store 29 can be centrally managed and segment formation commands 46 can be updated or amended based on research, or changes to the design of the writing instrument 10. The computational task of recognising the segment formation command 46 is devolved from the writing instrument 10 to the external processing apparatus 50, thus reducing the electrical use of the power source 21.

According to an embodiment, the speech recognition process is also performed by an external processing apparatus 50. In this case, the writing instrument 10 obtains an audio sample either from the writing instrument 10, or from a microphone communicably coupled to the external processing apparatus 50, or from an audio data file accessible to the external processing apparatus 50. The computational tasks of recognising the segment formation command 46 and performing speech processing are devolved from the writing instrument 10 to the external processing apparatus 50, thus reducing the electrical use of the power source 21.

For example, asynchronous audio speech recognition program receives a plurality of audio samples from the writing instrument 10 as they are generated. The audio samples are transmitted to an external processing apparatus 50, where a speech-to-text application programming interface (API) is invoked to convert the audio samples to a machine readable representation of the converted speech and/or segment formation commands for operating the electronically actuated nib manipulator 14 of the writing instrument 10. In this example, the writing instrument 10 is configured to poll the external processing apparatus 50 to obtain the machine readable representation of the converted speech and/or segment formation commands.

For example, audio speech recognition can be performed in a streaming mode, in which audio samples captured by the writing instrument 10 are continuously transmitted to the external processing apparatus 50, converted by a speech-to-text application programming interface (API) converted to converted speech and/or segment formation commands, and then transmitted back to the writing instrument 10.

Figure 6:
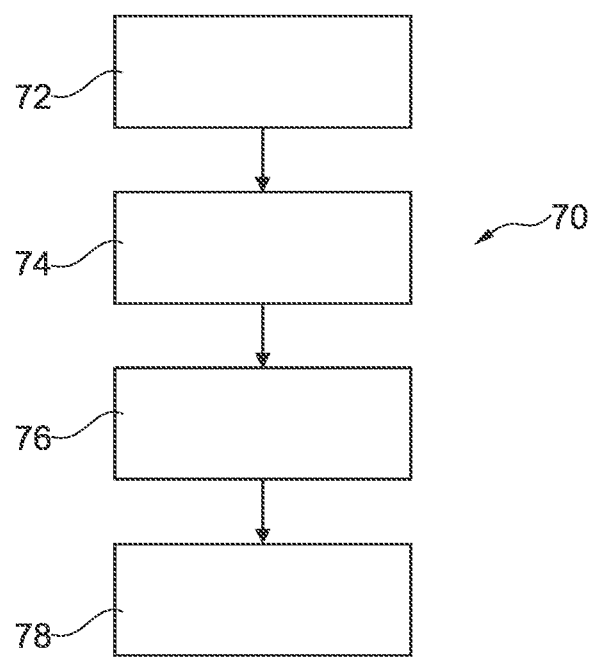
FIG. 6 schematically illustrates an example of a method according to the second aspect.

FIG. 6 schematically illustrates an example of a method according to the second aspect.

According to a second aspect, there is provided a computer implemented method 70 for generating one or more segment formation commands for causing a writing instrument 10 according to the first aspect, or its embodiments, to scribe a predefined character onto the writing surface 62.

The method comprises:
obtaining 72 an audio or graphical sample from a user;
performing 74 speech recognition 28 on the audio sample, or image recognition on the graphical sample to convert the audio or graphical sample to one, or more, character identifiers;
referencing 76 one, or more, records of a predefined character store 29 corresponding to the one, or more, character identifiers 44, wherein the predefined character store 29 comprises a plurality of records indexed by one, or more, corresponding character identifiers, wherein each record comprises one or more segment formation commands 46 configured to cause an electronically actuated nib manipulator 14 of the writing instrument to form a predefined character; and
providing the one or more segment formation commands 46 to the writing instrument 10.

According to an embodiment, there is provided the step of actuating the electronically actuated nib manipulator 14 based on the one or more segment formation commands 46, to cause the writing instrument 10 to scribe a segment onto a writing surface 62.

In an embodiment, the audio or graphical sample contain an audio or graphical signal that can be used to identify one or more predefined characters to be scribed onto a writing surface 62.

In an embodiment, the method comprises the step of actuating the nib manipulator 14 of the writing instrument 10 according to the one or more segment formation commands 46, to form a symbol on a writing surface 62 as defined by the one or more segment formation commands 46.

For example, in use the operator of the writing instrument 10 activates writing instrument by a power switch or by moving the writing instrument 10 (such a movement can be detected by the inertial measurement unit 22, and communicated to the electronic control unit 20 as a signal to switch the writing instrument 10 from a sleep mode to an active mode).

The user enunciates a symbol that they intend to be scribed by the writing instrument 10 onto the writing surface 62, so that the writing instrument 10 and/or a proximate external computing apparatus 50 capture an audio signal representing the intended symbol. In another example, the user obtains a digital image of a symbol that they intend to be scribed by the writing instrument 10 onto the writing surface 62 using a smart phone camera, or loads an intended portion of text data comprising an equation from a graphical user interface a word processing program into the writing instrument 10 using a plug-in of the word processing program, for example.

One or more character identifiers 44 are generated either by speech recognition of the captured audio signal, graphical symbol recognition of the symbol in the picture, or based on the portion of text data. A predetermined character store 29 is interrogated using the one or more character identifiers 44, to thus obtain a segment formation command 46. The electronic control unit 22 of the writing instrument 10 converts the segment formation command 46 into actuation signals of the actuators 36a-c. The user holds the writing instrument 10 proximate to a writing surface 62, such that the spatial domain XP, YP, ZP defined by the nib manipulator 14 intersects the writing surface 62. The electronic control unit 22 of the writing instrument 10 forms the intended symbol enunciated by the user as the user moves the right instrument 10 across the writing surface 62. In examples, speed and/or direction feedback of writing instrument 10 is captured by a tracking wheel 42. The speed and/or direction feedback is provided to the electronic control unit 22. The electronic control unit 22 adapts the actuation signals of the actuators 36a-c according to the speed and/or direction feedback, so that, for example, an unexpected change in writing speed or direction will not cause the automatically described symbol to be distorted.

Figure 7:
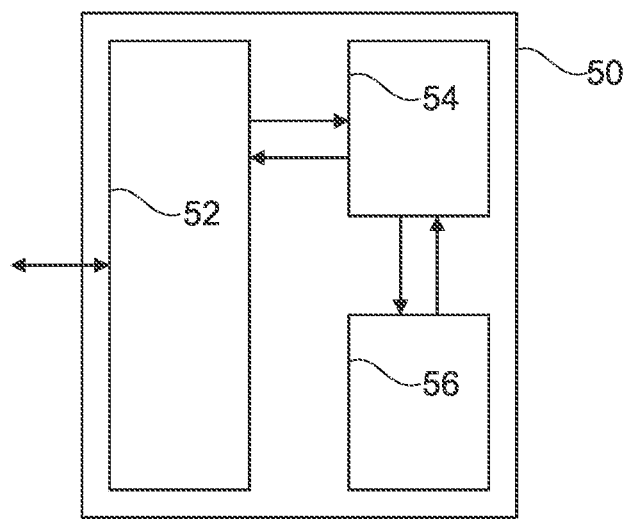
FIG. 7 schematically illustrates an example of an external processing apparatus.

FIG. 7 schematically illustrates an example of an external processing apparatus 50. The external processing apparatus 50 is not comprised inside the writing instrument 10, but may be, for example, a personal computer, smartphone, tablet, or an external server.

The external processing apparatus 50 comprises an I/O (input-output) interface 52 comprising a wireless modem. The external processing apparatus 50 a processor 54, and a memory 56.

In an embodiment, the I/O interface of the external processing apparatus 50 is configured to receive from a writing instrument 10 according to the first aspect, input data defining one or more characters that is intended to be scribed by the writing instrument 10. According to an example, the input data is an audio signal, and the processor 54 performs preprocessing on the audio signal, speech recognition, and identifies at least one segment formation commands 46 using a predefined character store 29 comprised in the memory 56 of the external processing apparatus 50. The external processing apparatus 50 then transmits the one or more segment formation commands 46 to the writing instrument 10 via the I/O interface 52.

According to an example, the input data is a character identifier 44 obtained by speech recognition performed at a writing instrument 10. In this example, the external processing apparatus 50 uses the current identifier 44 to identify at least one segment formation commands 46 using a predefined character store 29 comprised in the memory 56 of the external processing apparatus 50. The external processing apparatus 50 then transmits the one or more segment formation commands 46 to the writing instrument 10 via the I/O interface 52.

For example, the external processing apparatus 50 is one of a smartphone, tablet, a desktop or laptop personal computer, and the like. For example, the external computing apparatus is configured to execute the method according to the second aspect, or its embodiments.

Figure 8:
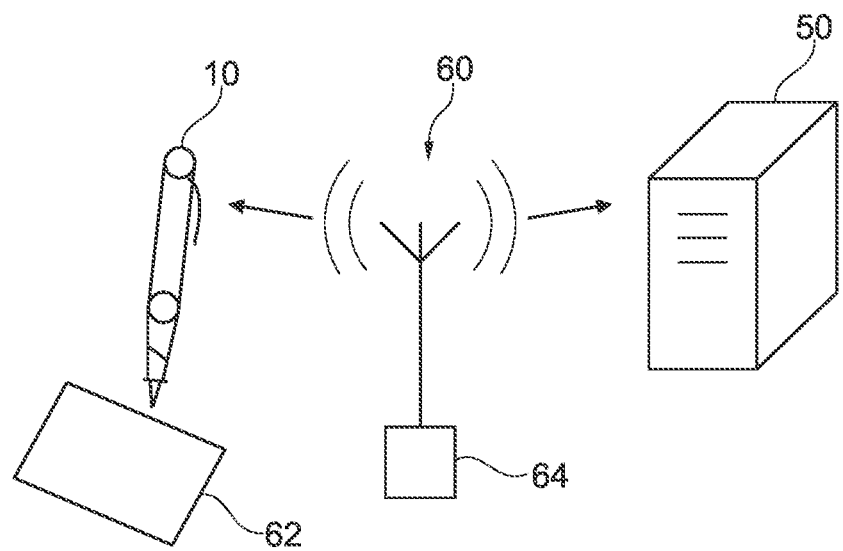
FIG. 8 schematically illustrates an example of a system according to the third aspect, in use.

FIG. 8 schematically illustrates an example of a system 60 according to the third aspect.

According to a third aspect, there is provided a system 60 comprising a writing instrument 10 according to the first aspect or its embodiments, and an external processing apparatus 50. The system 60 comprises a wireless communications network 64 configured to communicably couple the writing instrument and the external processing apparatus. The wireless modem of the writing instrument is configured to transmit an audio sample obtained by the microphone 24 of the writing instrument 10 to the external processing apparatus 50 via the wireless communications network 64.

The external processing apparatus 50 is configured to perform speech recognition on the audio sample, thus converting the audio sample to one, or more, character identifiers.

The external processing apparatus 50 is configured to reference one, or more, records of a predefined character store 29 corresponding to the one, or more, character identifiers. The predefined character store 29 comprises a plurality of records indexed by one, or more, corresponding character identifiers 44. Each record comprises one or more segment formation commands configured to cause an electronically actuated nib manipulator 14 of the writing instrument 10 to form a predefined character. The external processing apparatus 50 is configured to transmit the one or more segment formation commands to the writing instrument 10.

The wireless communication network 64 is, in embodiments, a Bluetooth™, Bluetooth Low Energy™, WiFi™ (802.11a, b, g, n, ac, ad), Wireless USB, UMTS, LTE, or ZigBee™ network. In embodiments, the wireless communication network 64 is communicably coupled to a Local Area Network (LAN) and/or a Wide Area Network (WAN).

The external processing apparatus 50 is, as described above, is one of a smartphone, tablet, a desktop or laptop personal computer, and the like. For example, the external computing apparatus is configured to execute the method according to the second aspect, or its embodiments. In embodiments, the external processing apparatus 50 is a server connected to a Wide Area Network (WAN), or cloud processing instance.

In examples, the writing instrument 10 obtains an audio sample (in examples, preprocessed to remove noise and to perform filtering) and transmits the audio sample via the wireless communication network 64 to the external processing apparatus 50. The external processing apparatus 50 performs a speech recognition on the audio sample. The external processing apparatus 50 extracts at least one character identifier 44 from the speech recognized in the audio sample. The external processing apparatus 50 uses the at least one character identifier 44 to interrogate a predefined character store 29. The external processing apparatus 50 extracts at least one segment formation command 46 from the predefined character store 29 based on the at least one character identifier 44. In examples, the external processing apparatus 50 can concatenate a plurality of segment formation commands 46 to generate a series of segment formation commands 46 capable of causing the writing instrument 10 describe a complex equation. The external processing apparatus 50 communicates the one or more segment formation commands 46 to the writing instrument 10 via the wireless communication network 64. A user holds the writing instrument 10 in proximity to a writing surface 62 and the writing instrument 10 proceeds to scribe the symbol or equation defined by the one or more segment formation commands 46.

According to another example, the external processing apparatus 50 receives a textual or computer code definition of a symbol or equation (for example, from an equation editor software program executed by the external processing apparatus 50). For example, the equations can be defined in ".XML" or "LaTeX" format. The external processing apparatus 50 extracts at least one character identifier 44 based on the output of the software program, and generates at least one segment formation command 46 based on the textual definition the equation. The external processing apparatus 50 communicates the one or more segment formation commands 46 to the writing instrument 10 via the wireless communication network 64.

According to another example, the external processing apparatus 50 receives a graphical definition of a symbol or equation, such as a photograph of mathematical equation. Software executed by the external processing apparatus 50 converts the mathematical equation into one or more character identifiers, and then obtains segment formation commands 46 from the predefined character store 29 in the manner described previously.

In embodiments, the external processing apparatus 50 is configured to update a predefined character store 29 when hosted by the external processing apparatus 50 by adding records, deleting records, or amending records from the predefined character store 29. For example, a software update performed via the LAN or WAN enables the predefined character store 29 to be updated.

In embodiments, the external processing apparatus 50 is configured to update a predefined character store 29 stored on the writing instrument 10 by adding records, deleting records, or amending records from the predefined character store 29.

Figure 9:
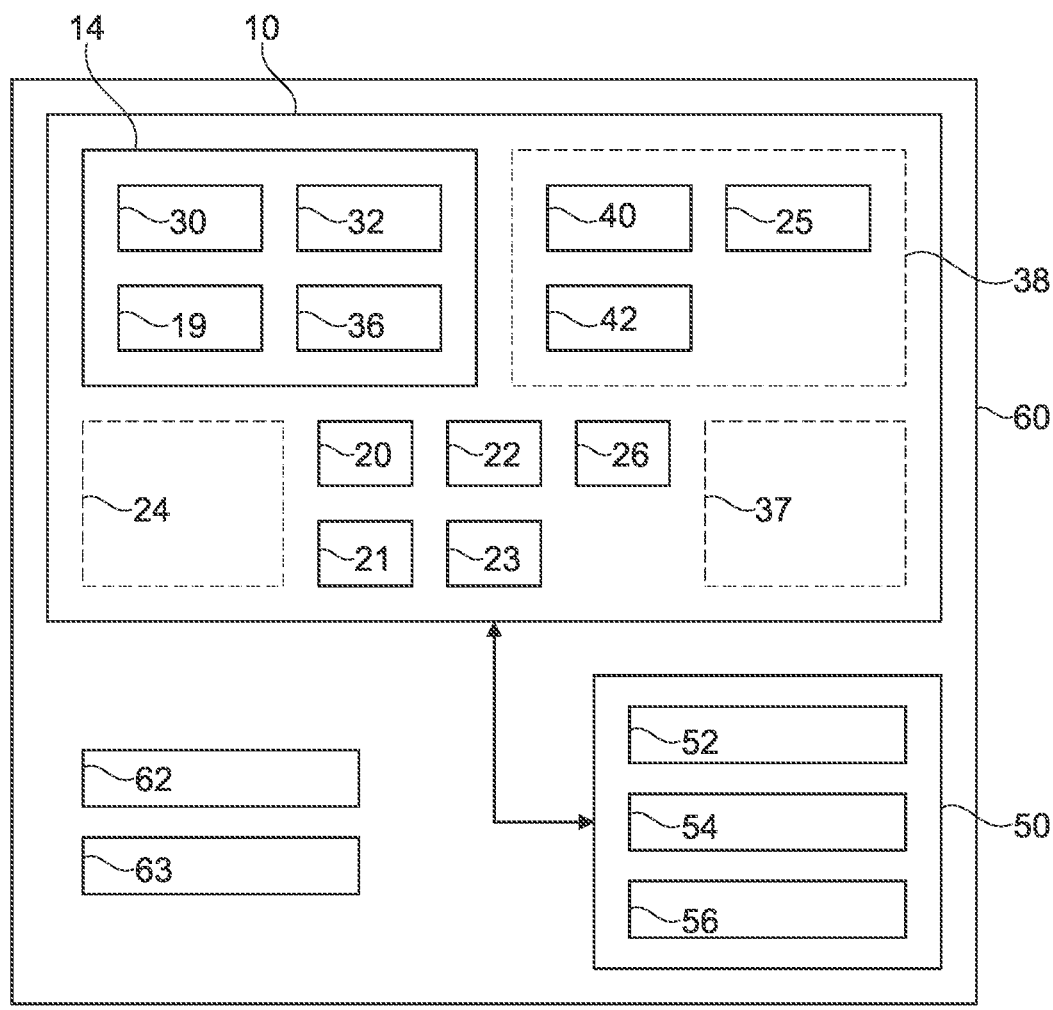
FIG. 9 schematically illustrates an example of the relationship of functional system components discussed herein.

FIG. 9 schematically illustrates an example of the relationship of functional system components discussed herein.

Like reference numerals to those discussed in the foregoing specification identify functional units of the system.

According to a fourth aspect, there is provided a computer program element comprising machine readable instructions which, when executed by a processing apparatus, cause the processing apparatus to perform the computer implemented method of the second aspect, or its embodiments.

According to a fifth aspect, there is provided a computer readable medium comprising the computer program element according to the fourth aspect.

References throughout the preceding specification to "one embodiment", "an embodiment", "one example" or "an example", "one aspect" or "an aspect" means that a particular feature, structure, or characteristic described in connection with the embodiment or example is included in at least one embodiment of the present disclosure. Thus, appearances of the phrases "in one embodiment", "in an embodiment", "one example" or "an example", "one aspect" or "an aspect" in various places throughout this specification are not necessarily all referring to the same embodiment or example.

Furthermore, the particular features, structures, or characteristics can be combined in any suitable combinations and/or sub-combinations in one or more embodiments or examples.

| REFERENCE NUMERALS | |
|---|---|
| P | Proximal end |
| D | Distal end |
| A | Principal axis |
| 10 | Writing instrument |
| 11 | Clip |
| 12 | Elongate body portion |
| 13 | Grip |
| 14 | Nib manipulator |
| 16 | End portion |
| 18 | Nib |
| 19a-e | Joints |
| XP | First axis |
| YP | Second axis |
| ZP | Third axis |
| 20 | Inertial measurement unit |
| 21 | Power source |
| 22 | Electronic control unit |
| 23 | Flexible tube |
| 24 | Microphone |

-continued

| REFERENCE NUMERALS | |
|---|---|
| 25 | Displacement detector |
| 26 | Wireless modem |
| 27 | Protrusion |
| 28 | Speech recognition unit |
| 29 | Predefined character store |
| 30 | Robotic mechanism |
| 31a, b | Actuation links |
| 32a, b, c | Arms |
| 33a, b | Anchors |
| 34a, b, c | Proximal ends of arms |
| 36a, b, c | Actuators of arms |
| 37 | Charging port |
| 38 | Protrusion mount |
| 40 | Protrusion |
| 42 | Tracking wheel |
| 44 | Character identifiers |
| 45 | Camera |
| 46 | Segment formation commands |
| 47 | Audio processing unit |
| 48 | Image preprocessing unit |
| 49 | Image recognition unit |
| 50 | External processing apparatus |
| 52 | I/O interface |
| 54 | Processor |
| 56 | Memory |
| 60 | System |
| 62 | Writing Surface |
| 63 | User hand |
| 64 | Wireless communication network |
| 70 | Method |
| 72 | Obtaining . . . |
| 74 | Performing . . . |
| 76 | Referencing . . . |
| 78 | Providing . . . |

The invention claimed is:

1. A writing instrument comprising:
an elongate body portion enabling a user to grip the writing instrument, wherein the elongate body portion comprises a distal end (D) and a proximal end (P), the proximal end and the distal end defining a principal axis (A) of the writing instrument;
an electronically actuated nib manipulator attached to the proximal end of the elongate body portion, wherein the nib manipulator further comprises an end portion comprising a nib, and the nib manipulator is configured to move the end portion within a spatial domain defined (i) along first (XP) and second (YP) axes of a plane that is substantially orthogonal to the principal axis (A), and (ii) along a third (ZP) axis that is an extension of the principal axis (A);
an inertial measurement unit configured to measure at least a position of the principal axis (A) relative to a writing surface; and
an electronic control unit operatively coupled to at least the inertial measurement unit and the nib manipulator; wherein the electronic control unit is configured to obtain one or more segment formation commands, and to receive the position of the principal axis (A) from the inertial measurement unit, and wherein the electronic control unit is configured to electronically actuate the nib manipulator so that the end portion moves within the spatial domain to scribe a predefined character defined by the one or more segment formation commands onto the writing surface.

2. The writing instrument according to claim 1, wherein the nib manipulator comprises:
a robotic mechanism that is configured to move the end portion of the nib manipulator within the spatial domain, wherein the robotic mechanism comprises a plurality of arms.

3. The writing instrument according to claim 2, wherein each arm of the plurality of arms comprises a proximal end coupled to the end portion, and wherein the distal end of each arm is coupled to a corresponding actuator.

4. The writing instrument according to claim 2, wherein the robotic mechanism is a delta mechanism.

5. The writing instrument according to claim 2, wherein the robotic mechanism prevents rotation of the end portion substantially around the principal axis (A).

6. The writing instrument according to claim 2, further comprising:
a displacement detector attached to the writing instrument, wherein the displacement detector is configured to detect, in use, a displacement velocity of the writing instrument across the writing surface; and
wherein the electronic control unit is configured to:
receive, from the displacement detector, the displacement velocity of the writing instrument, and to electronically actuate the nib manipulator based, additionally, on a displacement rate of the writing instrument.

7. The writing instrument according to claim 6, wherein the writing instrument further comprises:
a protrusion from the proximal end of the elongate body portion, and
a proximal end of the protrusion comprises the displacement detector,
wherein the displacement detector is a trackball, or a tracking wheel comprising a position encoder, or an optical sensor configured to contact the writing surface, in use.

8. The writing instrument according to claim 1, wherein the writing instrument further comprises:
a contact detector capable of detecting that the nib comprised on the end portion is in contact with the writing surface, wherein the electronic control unit is configured to receive, from the contact detector, a contact signal indicating that the end portion is in contact with the writing surface, and wherein the electronic control unit is configured to begin scribing a predetermined character upon reception of the contact signal.

9. The writing instrument according to claim 1, further comprising:
a microphone coupled to an audio processing unit; and
a wireless modem,
wherein the microphone is configured to obtain an audio sample from a user proximate to the writing instrument, and the audio processing unit is configured to apply pre-processing to the audio sample.

10. The writing instrument according to claim 9, wherein the wireless modem is configured to transmit the audio sample to an external processing apparatus, wherein the wireless modem is further configured to receive the one or more segment formation commands from the external processing apparatus in response to the external processing apparatus receiving the audio sample.

11. The writing instrument according to claim 10, wherein the electronic control unit is configured to obtain the one or more segment formation commands from the wireless modem, and actuate the electronically actuated nib manipulator to scribe the one or more predefined characters on the writing surface as defined in the audio sample.

12. The writing instrument according to claim 9, further comprising:

a speech recognition unit; and a predefined character store comprising a plurality of records, wherein each record comprises (i) the one or more segment formation commands configured to cause the electronically actuated nib manipulator to form a predefined character, and (ii) one or more character identifiers corresponding to a recognized audio sample identifying the predefined character; and wherein the microphone is configured to obtain the audio sample comprising a writing instruction from the user, and the audio processing unit is configured to pre-process the writing instruction.

13. The writing instrument according to claim 12, wherein the speech recognition unit is configured to obtain the audio sample from the audio processing unit and to convert the audio sample to a character identifier referenced to a record of the predefined character store, and wherein the electronic control unit is configured to obtain the one or more segment formation commands from the predefined character store corresponding to the character identifier, and to scribe the predefined character on the writing surface based on the received audio sample.

14. The writing instrument according to claim 1, wherein the elongate body portion further comprises either (i) an ink supply, and a flexible supply tube configured to supply ink to the nib, or (ii) a pencil or crayon attachment.

15. A computer-implemented method for generating one or more segment formation commands for causing a writing instrument to scribe a predefined character onto a writing surface, wherein the method comprises:

obtaining an audio or graphical sample from a user;

performing speech recognition on the audio sample, or image recognition on the graphical sample to convert the audio or graphical sample to one, or more, character identifiers;

referencing one, or more, records of a predefined character store corresponding to the one, or more, character identifiers, wherein the predefined character store comprises a plurality of records indexed by one, or more, corresponding character identifiers, wherein each record comprises one or more segment formation commands configured to cause an electronically actuated nib manipulator of the writing instrument to form the predefined character; and providing the one or more segment formation commands to the writing instrument.

16. A non-transitory computer program element comprising machine readable instructions which, when executed by a processor, causes the processor to perform the computer-implemented method of claim 15.

17. A computer readable medium comprising the computer program element according to claim 16.

18. A system comprising:

a writing instrument;

an external processing apparatus; and a wireless communications network configured to communicably couple the writing instrument and the external processing apparatus;

wherein a wireless modem of the writing instrument is configured to transmit an audio sample obtained by a microphone of the writing instrument to the external processing apparatus via the wireless communications network;

wherein the external processing apparatus is configured to perform speech recognition on the audio sample, thus converting the audio sample to one, or more, character identifiers;

wherein the external processing apparatus is configured to reference one, or more, records of a predefined character store corresponding to the one, or more, character identifiers, wherein the predefined character store comprises a plurality of records indexed by one, or more, corresponding character identifiers, wherein each record comprises one or more segment formation commands configured to cause an electronically actuated nib manipulator of the writing instrument to form a predefined character; and wherein the external processing apparatus is configured to transmit the one or more segment formation commands to the writing instrument.

19. The system according to claim 18, wherein the writing instrument further comprises:

an elongate body portion enabling a user to grip the writing instrument, wherein the elongate body portion comprises a distal end (D) and a proximal end (P), the proximal end and the distal end defining a principal axis (A) of the writing instrument;

the electronically actuated nib manipulator attached to the proximal end of the elongate body portion, wherein the nib manipulator further comprises an end portion comprising a nib, and the nib manipulator is configured to move the end portion within a spatial domain defined (i) along first (XP) and second (YP) axes of a plane that is substantially orthogonal to the principal axis (A), and (ii) along a third (ZP) axis that is an extension of the principal axis (A);

an inertial measurement unit configured to measure at least a position of the principal axis (A) relative to a writing surface; and an electronic control unit operatively coupled to at least the inertial measurement unit and the nib manipulator;

wherein the electronic control unit is configured to obtain one or more segment formation commands, and to receive the position of the principal axis (A) from the inertial measurement unit, and wherein the electronic control unit is configured to electronically actuate the nib manipulator so that the end portion moves within the spatial domain to scribe the predefined character defined by the one or more segment formation commands onto the writing surface.

20. The system according to claim 19, wherein the wireless modem is configured to transmit the audio sample to the external processing apparatus, wherein the wireless modem is further configured to receive the one or more segment formation commands from the external processing apparatus in response to the external processing apparatus receiving the audio sample, and wherein the electronic control unit is configured to obtain the one or more segment formation commands from the wireless modem, and actuate the electronically actuated nib manipulator to scribe the one or more predefined characters on the writing surface as defined in the audio sample.

* * * * *